Jan. 31, 1933. E. CLEM 1,895,539
SPRING WHEEL
Filed Dec. 3, 1931 4 Sheets-Sheet 1

Inventor
Elmer Clem

By Clarence A. O'Brien
Attorney

Jan. 31, 1933.    E. CLEM    1,895,539
SPRING WHEEL
Filed Dec. 3, 1931    4 Sheets-Sheet 2
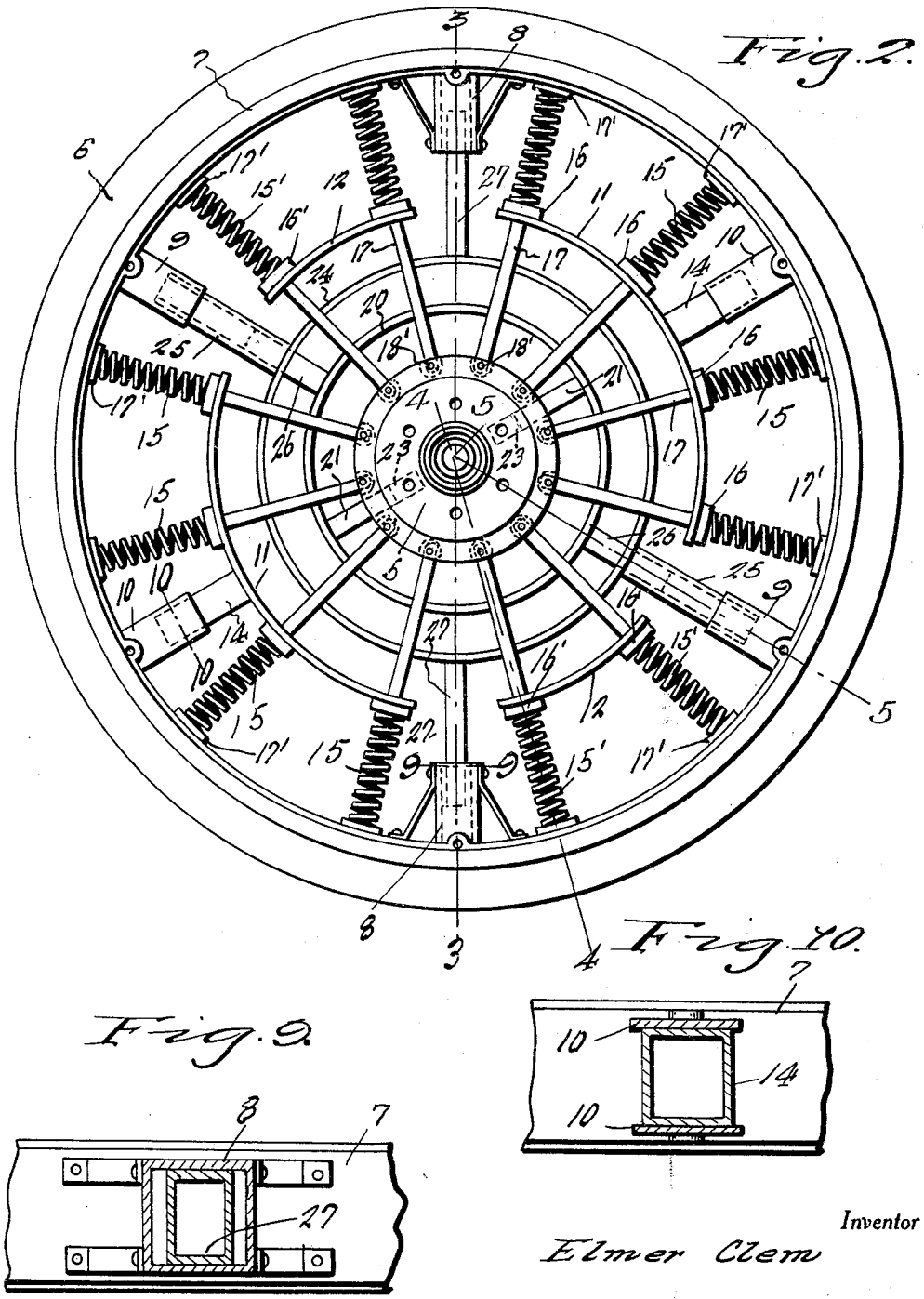
Inventor
Elmer Clem
By Clarence A. O'Brien
Attorney Jan. 31, 1933.   E. CLEM   1,895,539
SPRING WHEEL
Filed Dec. 3, 1931   4 Sheets-Sheet 3
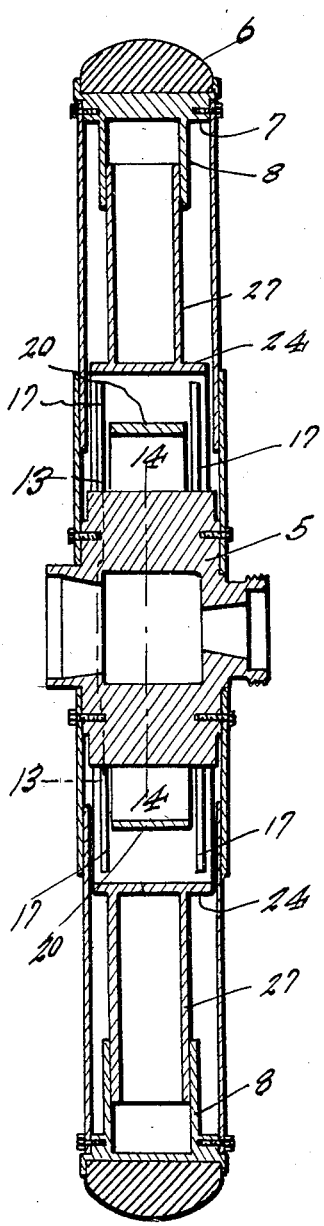
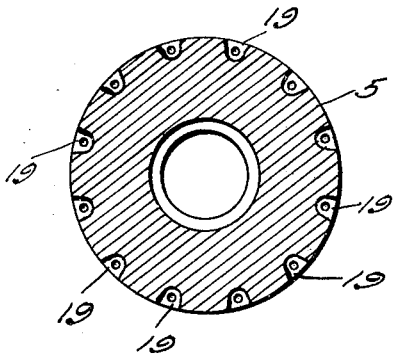
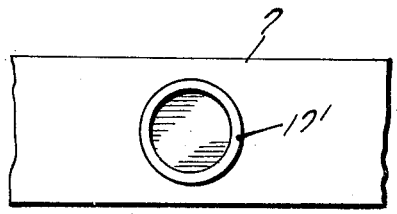
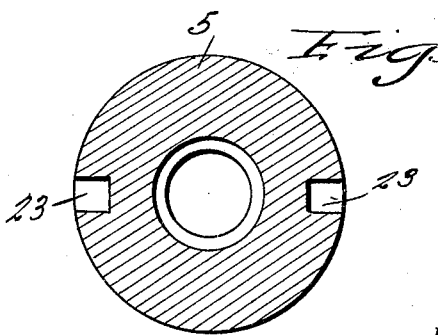
Inventor
Elmer Clem
By Clarence A. O'Brien
Attorney Jan. 31, 1933. E. CLEM 1,895,539
SPRING WHEEL
Filed Dec. 3, 1931 4 Sheets-Sheet 4
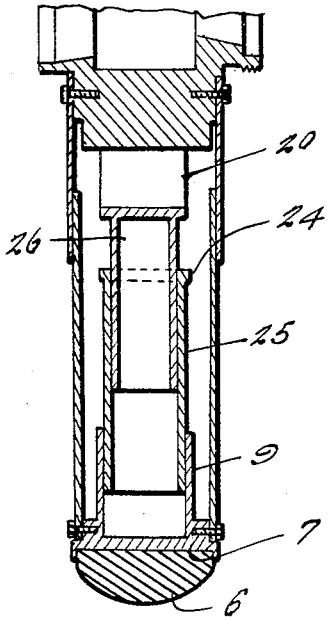
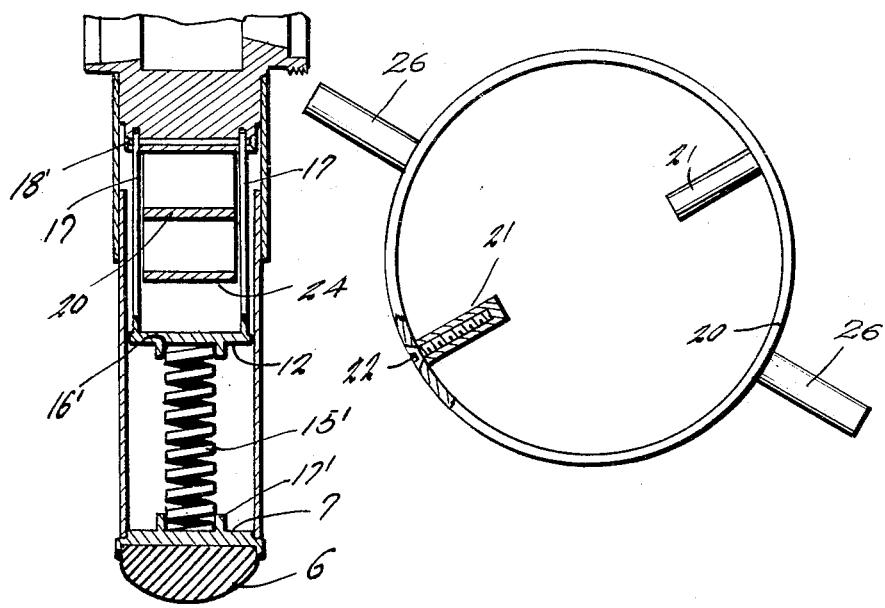
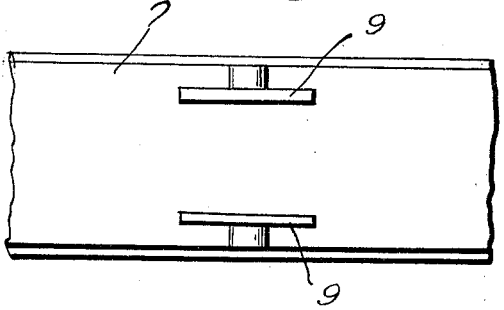
Inventor
Elmer Clem
By Clarence A. O'Brien
Attorney Patented Jan. 31, 1933

1,895,539

UNITED STATES PATENT OFFICE

ELMER CLEM, OF BAYTOWN, TEXAS

SPRING WHEEL

Application filed December 3, 1931. Serial No. 578,819.

The present invention relates to spring wheels designed particularly for use on motor vehicles such as automobiles, trucks and the like and has for its object to provide a wheel of this nature which is strong and durable in its construction, thoroughly efficient and reliable in use, and possessed of the necessary resilient qualities to replace with equal efficiency the pneumatic tired type of wheel.

With the above and other objects in view as will appear as the description proceeds, the invention resides in certain novel features of construction, and in the combination and arrangement of parts as will be hereinafter more fully described and claimed.

In the drawings:

Figure 2 is another side elevation thereof with side plates removed.

Figure 3 is a diametrical section therethrough taken substantially on the line 3—3 of Figure 2.

Figure 4 is a radial section taken substantially on the line 4—4 of Figure 2.

Figure 5 is a similar section taken substantially on the line 5—5 of Figure 2.

Figure 8 is a side elevation showing a portion in section of the inner annular member.

Figure 9 is a detail section taken substantially on the line 9—9 of Figure 2.

Figure 10 is a detail section taken substantially on the line 10—10 of Figure 2.

Figure 11 is a fragmentary inside view of the rim showing the guide plates 9.

Figure 12 is a fragmentary outside view of one of the arcuate sections.

Figure 13 is a detail section through the hub taken substantially on the line 13—13 of Figure 3, and Figure 14 is a detail section through the hub taken substantially on the line 14—14 of Figure 3.

Figure 1:
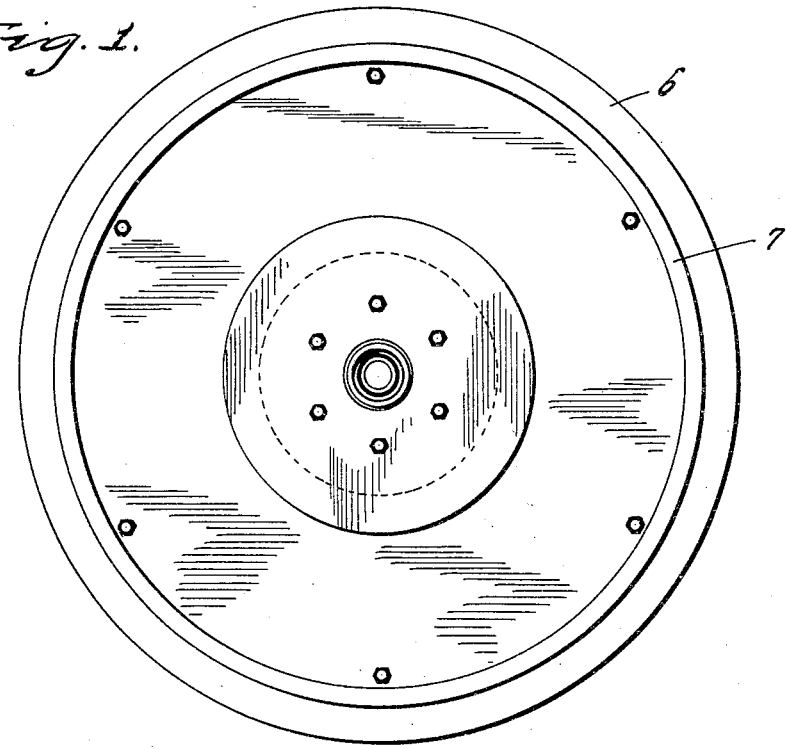
Figure 1 is a side elevation of a wheel embodying the features of my invention.
Figure 6:
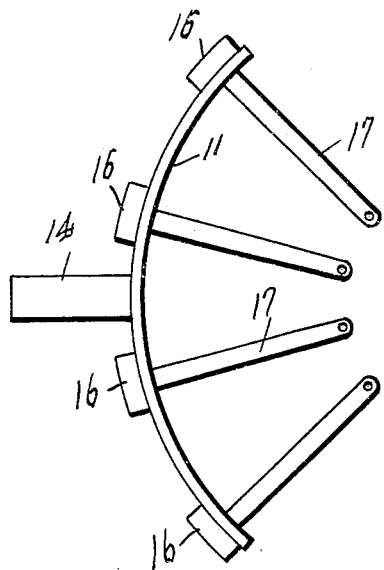
Figure 6 is a detail elevation of one of the arcuate sections.
Figure 7:
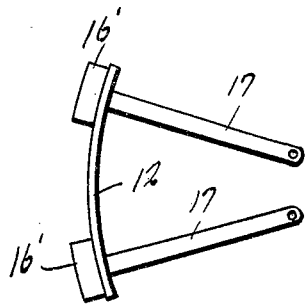
Figure 7 is a similar view of another of the arcuate sections.

Referring to the drawings in detail it will be seen that the numeral 5 denotes a hub. The numeral 7 denotes a rim with a solid tire 6 mounted thereon. The rim 5 is provided with inwardly radiating square sockets 8 at diametrically opposite points. Guide plates 9 arranged in pairs radiate inwardly from the rim 7, a pair at diametrically opposite points. Similar guide plates 10 radiate in pairs inwardly from the rim 7 at diametrically opposite points. Numerals 11 and 12 denote two pairs of arcuate sections alternately arranged with respect to each other, the latter being shorter in length than the former. The sections 11 at their center have outwardly directed square hollow members 14 extending slidably between guide plates 10. Coil springs 15 are disposed between the rim 7 and the sections 11 and have their ends seated in seats 16 on the sections 11 and seats 17' on the inside of the rim 7.

A plurality of rods 17 arranged in pairs extend from side portions of the sections 11 inwardly and are anchored as at 18 in notches 19 formed in the hub 5. Sections 12 are also provided with pluralities of rods 17 radiating inwardly from the side portions thereof and anchored as at 18' in notches 19.

Coil springs 15' extend between the rim 7 and the sections 12 having their ends disposed in seats 16' and 17' formed on the sections 12 and the rim 7 respectively.

Numeral 20 denotes an inner annular member disposed about and in spaced relation to the hub between the pairs of rods 17 and formed with inwardly directed lugs 21 threaded on bolts 22 for adjustment purposes as shown clearly in Figure 8 and these lugs 21 extend into seats 23 formed in the periphery of the hub and radiating inwardly thereof at diametrically opposite points. Numeral 24 denotes an outer annular member disposed about and in spaced relation to the member 20 and extending between the rods 17 and being spaced inwardly from the sections 11 and 12. Square sleeves 25 are formed on the member 24 to radiate outwardly therefrom and terminate between the guide plates 9 and the annular member 20 is formed with square sleeves 26 radiating outwardly therefrom and telescoped into the sleeves 25.

The rim 24 is also formed with outwardly radiating square sleeves 27 which have end portions telescoped into the sockets 8.

As will be seen the pairs of plates 9 and 10 form guideways for permitting circumferential movement of members 14 and 25 but preventing lateral movement of such members 14 and 25 and the sockets 8 are so formed, as shown in Figure 9 that the members 27 are permitted a certain amount of circumferential movement in the sockets. When the wheel is rotated one of the members 27 will be engaging the forward side of the socket 8 and the other member 27 will be engaging the forward side of its socket so that these members and their sockets will impart a rotary movement to the rim 7 from the hub. The plates 9 and 10 prevent lateral movement of the interior parts of the wheel in relation to the rim 7 and the play of the members 27 in the sockets 8 permits sufficient movement of the rim in relation to the hub to provide the cushioning effect.

From the above detailed description considered carefully with the drawings it will be readily appreciated that the wheel possesses resilient qualities for absorbing road shock and the like.

It is thought that the construction, operation and advantages of the invention will be apparent to those skilled in this art without a more detailed description thereof.

Having thus described my invention, what I claim as new is:

1. In a wheel of the class described, a hub, an annular member circumjacent the hub in spaced relation thereto, and having inwardly directed lugs extending into seats formed in the periphery of the hub and formed with outwardly directed sleeves, a second annular member circumjacent the first annular member and in spaced relation thereto and having outwardly directed sleeves radiating therefrom and in registry with openings into which the sleeves of the first annular member extend to telescope in the sleeves of the second annular member, a rim, sockets radiating inwardly from the rim, and sleeve members radiating outwardly from the second annular member to terminate telescopically in the sockets, and spring resilient means interposed between the hub and the rim.

2. In a wheel of the class described, a hub, an annular member circumjacent the hub in closed relation thereto, and having inwardly directed lugs extending into seats formed in the periphery of the hub and formed with outwardly directed sleeves, a second annular member circumjacent the first annular member and in spaced relation thereto and having outwardly directed sleeves radiating therefrom and in registry with openings into which the sleeves of the first annular member extend to telescope in the sleeves of the second annular member, a rim, sockets radiating inwardly from the rim, and sleeve members radiating outwardly from the second annular member to terminate telescopically in the sockets, a plurality of arcuate sections circumjacent the second annular member and in spaced relation thereto, rods connecting the sections with the hub, and springs interposed between the sections and the rim.

3. In a wheel of the class described, a hub, an annular member circumjacent the hub in closed relation thereto, and having inwardly directed lugs extending into seats formed in the periphery of the hub and formed with outwardly directed sleeves, a second annular member circumjacent the first annular member and in spaced relation thereto and having outwardly directed sleeves radiating therefrom and in registry with openings into which the sleeves of the first annular member extend to telescope in the sleeves of the second annular member, a rim, sockets radiating inwardly from the rim, and sleeve members radiating outwardly from the second annular member to terminate telescopically in the sockets, a plurality of arcuate sections circumjacent the second annular member and in spaced relation thereto, rods connecting the sections with the hub, and springs interposed between the sections and the rim, pairs of guide plates radiating inwardly from the rim and sleeves extending outwardly from some of the sections to terminate slidably between said guide plates.

4. In a wheel of the class described, a hub, an annular member circumjacent the hub in closed relation thereto, and having inwardly directed lugs extending into seats formed in the periphery of the hub and formed with outwardly directed sleeves, a second annular member circumjacent the first annular member and in spaced relation thereto and having outwardly directed sleeves radiating therefrom and in registry with openings into which the sleeves of the first annular member extend to telescope in the sleeves of the second annular member, a rim, sockets radiating inwardly from the rim, and sleeve members radiating outwardly from the second annular member to terminate telescopically in the sockets, a plurality of arcuate sections circumjacent the second annular member and in spaced relation thereto, rods connecting the sections with the hub, and springs interposed between the sections and the rim, pairs of guide plates radiating inwardly from the rim and sleeves extending outwardly from some of the sections to terminate slidably between said guide plates, and other pairs of guide plates radiating inwardly from the rim between which the outer ends of the first mentioned sleeves of the second annular member slidably terminate.

In testimony whereof I affix my signature.

ELMER CLEM.